United States Patent
Lee et al.

(10) Patent No.: US 9,096,111 B2
(45) Date of Patent: Aug. 4, 2015

(54) COUPLED TORSION BEAM AXLE TYPE SUSPENSION SYSTEM

(71) Applicant: Hyundai Motor Company, Seoul (KR)

(72) Inventors: Jaekil Lee, Suwon-si (KR); Youn Hyung Cho, Seoul (KR); Seon Pyung Kim, Seoul (KR); Dong Min Lim, Ansan-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/485,527

(22) Filed: Sep. 12, 2014

(65) Prior Publication Data

US 2015/0123371 A1 May 7, 2015

(30) Foreign Application Priority Data

Nov. 4, 2013 (KR) .................. 10-2013-0132954

(51) Int. Cl.
 *B60G 21/05* (2006.01)
(52) U.S. Cl.
 CPC .................... *B60G 21/052* (2013.01)
(58) Field of Classification Search
 CPC .... B60G 21/051; B60G 21/052; B60G 9/003; B60G 2200/21; B60G 2204/1226
 USPC .................... 280/124.107, 124.128
 See application file for complete search history.

(56) References Cited

U.S. PATENT DOCUMENTS

| 5,895,063 | A  | * | 4/1999 | Hasshi et al. | 280/124.134 |
| 6,152,467 | A  | * | 11/2000 | Alesso et al. | 280/124.13 |
| 7,077,407 | B2 | * | 7/2006 | Shin | 280/124.107 |
| 2004/0262985 | A1 | * | 12/2004 | Nicolas | 301/124.1 |
| 2007/0052192 | A1 | * | 3/2007 | Kawanobe et al. | 280/124.13 |
| 2013/0056947 | A1 | * | 3/2013 | Moon et al. | 280/124.128 |
| 2013/0062849 | A1 | * | 3/2013 | Kim et al. | 280/93.511 |
| 2013/0062850 | A1 | * | 3/2013 | Kim et al. | 280/93.511 |
| 2013/0099462 | A1 | * | 4/2013 | Ehrlich et al. | 280/124.116 |

FOREIGN PATENT DOCUMENTS

| JP | 2001-39136 A | 2/2001 |
| JP | 2009-173193 A | 8/2009 |
| JP | 2013-52855 A | 3/2013 |
| KR | 10-2013-0125062 A | 11/2013 |

* cited by examiner

*Primary Examiner* — Paul N Dickson
*Assistant Examiner* — Darlene P Condra
(74) *Attorney, Agent, or Firm* — Morgan, Lewis & Bockius LLP

(57) ABSTRACT

A coupled torsion beam axle type suspension system may include trailing arms respectively coupled to opposite ends of a torsion beam, a trailing arm bush coupled to a front end portion of the trailing arm, a link bracket mounted in front of the trailing arm bush and engaged therewith in a width direction of a vehicle, and a lower mounting bush mounted outside of the trailing arm bush in front thereof, installed in the link bracket, and engaged with a lower part of the vehicle body in a height direction of the vehicle, and an upper mounting bush offset, with respect to the lower mounting bush, by a predetermined width in the width direction of the vehicle, a predetermined height in a height direction thereof, and a predetermined length in a length direction of the vehicle body.

11 Claims, 6 Drawing Sheets

COUPLED TORSION BEAM AXLE TYPE SUSPENSION SYSTEM

CROSS-REFERENCE TO RELATED APPLICATION

The present application claims priority to and the benefit of Korean Patent Application No. 10-2013-0132954 filed on Nov. 4, 2013, the entire contents of which is incorporated herein for all purposes by this reference.

BACKGROUND OF THE INVENTION

1. Field of the Invention

The present invention relates to a coupled torsion beam axle type suspension system, and more particularly, to a coupled torsion beam axle type suspension system for simultaneously improving impact and roll characteristics of an outer rear wheel with respect to thrust and drag forces as well as controlling movement (i.e., toe) characteristics thereof with respect to a side force, when a vehicle turns.

2. Description of Related Art

Generally, despite a limitation in design performance factors such as ride comfort, driving stability, etc., a coupled torsion beam axle type suspension system (hereinafter referred to as a CTBA) has been primarily applied to rear wheel suspension systems for compact and mid-size cars, compared with independent-type suspension systems, because they have advantages of light weight and low production cost due to their simpler components.

FIG. 1 is a perspective view of a CTBA according to one example of the related art.

Referring to FIG. 1, a CTBA according to one example of the related art is provided with a torsion beam 1 in a width direction of a vehicle, trailing arms 5 respectively coupled to opposite ends of the torsion beam 1, and carriers 3 for mounting wheel tires at the trailing arms 5.

A spring seat 9 for mounting a spring 7 thereon and a shock absorber pin 13 for coupling with a shock absorber 11 are provided at a rear inner portion of the trailing arm 5.

In addition, a vehicle body-engaging unit 15 is provided at a front end portion of the trailing arm 5 to be coupled to a vehicle body.

Each vehicle body-engaging unit 15 includes a trailing arm bush 21 that is coupled to the front end portion of the trailing arm 5, and a mounting bracket 23 that is coupled to the trailing arm bush 21 through a bolt 25.

According to the CTBA having the aforementioned configuration, wheels are deformed due to twisting deformation characteristics of the torsion beam 1, and in addition to that, a position of the trailing arm 5 and a configuration of the vehicle body-engaging unit 15 cause deformation of the wheels.

The vehicle should maintain an under-steering tendency in consideration of driving stability when it turns, and for this purpose, it is ideal that a rear outer wheel of a turning vehicle (hereinafter referred to as a rear outer wheel) should be induced to toe-in and a rear inner wheel of the turning vehicle (hereinafter referred to as a rear inner wheel) should be induced to toe-out.

However, the conventional CTBA has following problems in its movement.

FIG. 2 is a top plan view illustrating movement characteristics of the coupled torsion beam axle type suspension system, applied with a side force, according to one example of the related art.

As shown in FIG. 2, though the CTBA according to one example of the related art is not freely moveable in terms of mechanics when applied with a side force F1, the entire CTBA rotates by the deformation of the trailing arm bush 21 and generates a toe angle at the rear outer wheel W1.

That is, when the vehicle turns, the bumped rear outer wheel W1 is applied with the side force F1 and thus is likely to be induced to toe-out, while the rebounded rear inner wheel W2 is applied with the side force F1 and thus is likely to maintain the previous toe angle or to be induced to toe-in, such that the vehicle is over-steered in general and thus causes deterioration of turning stability.

As a mechanical instantaneous rotational center point SP of the CTBA with respect to the vehicle body (i.e., an intersection of lines that extend in engaging directions of the trailing arm bushes 21 engaged with the vehicle body) is positioned in front of the wheel centers WC, the rear outer wheel W1 has a tendency to toe-out due to the side force F1 while the rear inner wheel W2 has a tendency to toe-in due to the side force F1.

Recently, in order to solve such turning stability problems of the conventional CTBA, suspension systems are being developed to improve a structure of the vehicle body and the vehicle body-engaging unit of the trailing arm 5 such that the instantaneous rotational center point SP of the CTBA with respect to the vehicle body is positioned behind the wheel centers WC.

FIG. 3 is a top plan view of a coupled torsion beam axle type suspension system according to another example of the related art.

Referring to FIG. 3 the improved CTBA according to the other example is provided with a link bracket 31 as a vehicle body-engaging unit 15 between a vehicle body and a trailing arm bush 21, such that an instantaneous rotational center point SP with respect to the vehicle body is positioned behind wheel centers WC.

That is, a rear end portion of the link bracket 31 is in parallel engaged with the trailing arm bush 21 in a width direction of the vehicle, and a front end portion thereof is provided with a vehicle body-mounter 33 that is freely rotatable with respect to the vehicle body in a rotating direction, thereby being engaged with one lower portion of the vehicle body.

In this case, the vehicle body-mounter 33 is coupled to the trailing arm bush 21 through the link bracket 31 and is engaged with the vehicle body in the height direction of the vehicle, such that it is engaged with the vehicle body at a front end portion of the link bracket 31 in the width direction of the vehicle.

Thus, the instantaneous rotational center point SP of the CTBA with respect to the vehicle body is formed at an intersection of the extending lines that connect centers S1 of the mounter 33 with centers S2 of the trailing arm bushes 21, and is positioned behind the wheel centers WC.

Accordingly, when the link bracket 31 is provided and thus the instantaneous rotational center point SP with respect to the vehicle body is positioned behind the wheel centers WC, if the rear wheels are applied with the side force F1, such as when the vehicle turns, the bumped rear outer wheel is induced to toe-in while the rebounded rear outer turning wheel W2 maintains a set toe angle or is induced to toe-out, such that the vehicle is generally under-steered to secure the turning stability.

However, in order for the aforementioned CTBA to be freely rotatable with respect to the vehicle body, high-strength bearings should be applied to the vehicle body-mounter 33 to which the link bracket 31 is applied, and accordingly, when the rear wheels are applied with the side force F1, only the trailing arm bush 21 acts as a strength member to control an amount of toe-in.

Accordingly, the trailing arm bush 21 should have a high-strength property, and therefore has drawbacks that impact characteristics against thrust and drag forces as well as NVH performance and durability are decreased.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a coupled torsion beam axle type suspension system that may include trailing arms respectively coupled to opposite ends of a torsion beam, and a vehicle body-engaging unit provided in a front end portion of each trailing arm and engaging the trailing arm with a vehicle body, wherein each vehicle body-engaging unit may include a trailing arm bush that is coupled to a front end portion of the trailing arm, a link bracket mounted in front of the trailing arm bush and engaged therewith in a width direction of a vehicle, a lower mounting bush mounted outside of the trailing arm bush in front thereof, installed in the link bracket, and engaged with a lower part of the vehicle body in a height direction of the vehicle, and an upper mounting bush offset, with respect to the lower mounting bush, by a predetermined width in the width direction of the vehicle, a predetermined height in a height direction thereof, and a predetermined length in a length direction of the vehicle body, to be installed in the link bracket and to be engaged with the vehicle body in the height direction thereof.

The link bracket may include a pocket portion formed to be inserted by and engaged with the trailing arm bush, a horizontal portion formed outside of the pocket portion in front thereof and installed with the lower mounting bush, and a vertical portion upwardly and extendedly formed outside of the horizontal portion in front thereof and installed with the upper mounting bush.

An instantaneous rotational center point at which extending lines passing centers of the lower mounting bushes and centers of the trailing arm bushes cross each other is set to be positioned behind wheel centers.

A center of the upper mounting bush is offset, based on a center of the lower mounting bush, by the predetermined width in the width direction of the vehicle, the predetermined height in the height direction thereof, and a predetermined length in the length direction of the vehicle body.

The lower and upper mounting bushes are respectively engaged with a bottom surface and an outer lateral surface of a side member of the vehicle body.

In another aspect of the present invention, a coupled torsion beam axle type suspension system (CTBA), may include trailing arms respectively coupled to opposite ends of a torsion beam, and a vehicle body-engaging unit provided in a front end portion of each trailing arm and engaging the trailing arm with a vehicle body, wherein each vehicle body-engaging unit may include a trailing arm bush coupled to a front end portion of the trailing arm, a link bracket mounted in front of the trailing arm bush and engaged therewith, a lower mounting bush installed in the link bracket and engaged with a lower part of the vehicle body in a height direction of a vehicle, and an upper mounting bush formed in the link bracket and engaged with one side of the vehicle body in the height direction thereof, wherein an instantaneous rotational center point at which extending lines passing centers of the lower mounting bushes and centers of the trailing arm bushes is set to be positioned behind wheel centers.

The link bracket is in parallel engaged with the trailing arm bush in the height direction of the vehicle, wherein the lower mounting bush is disposed outside of the trailing arm bush in front thereof and is engaged with a lower portion of the vehicle body on the link bracket in the height direction of the vehicle, and wherein the upper mounting bush is upwardly disposed outside of the lower mounting bush in front thereof and is engaged with the link bracket in a width direction of the vehicle.

The link bracket may include a pocket portion inserted by and engaged with the trailing arm bush, a horizontal portion formed outside of the pocket portion in front thereof and mounted with the lower mounting bush, and a vertical portion upwardly and extendedly formed outside of the horizontal portion in front thereof and mounted with the upper mounting bush.

An extending line that passes a center of the lower mounting bush and a center of the trailing arm bush forms an acute angle with a center line that passes a center of the trailing arm bush in a length direction of the vehicle body.

The center of the upper mounting bush is offset, based on the center of the lower mounting bush, by a predetermined width in the width direction of the vehicle, by a predetermined height in the height direction thereof, and by a predetermined length in the length direction of the vehicle body.

The lower and upper mounting bushes are respectively engaged with a bottom surface and an outer lateral surface of a side member of the vehicle body.

According to the exemplary embodiment of the present invention, as the link bracket is applied and the instantaneous rotational center point SP with respect to the vehicle body is positioned behind wheel centers WC, the outer rear wheel is induced to toe-in and the inner rear wheel is induced to toe-out by the side force when the vehicle turns, thereby securing the turning stability.

In addition, as the strength member including the upper and lower mounting bushes is additionally provided in the link bracket, the strengths of the trailing arm bush and the lower mounting bush are connected in series to improve the impact characteristics against the thrust and drag forces, and the strengths of the lower and upper mounting bushes are connected in parallel to reinforce the distortion, thereby improving the roll characteristics.

Further, as the strength member including the lower and upper mounting bushes is additionally provided, a vibration property such as NVH is improved and the rotational strength of the lower mounting bush, which may not be sufficient due to use of rubber materials, is offset in three directions by the predetermined width, height, and length with respect to the lower mounting bush and is reinforced by the upper mounting bush that is engaged with the side member, thereby improving durability of the vehicle body-engaging unit.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
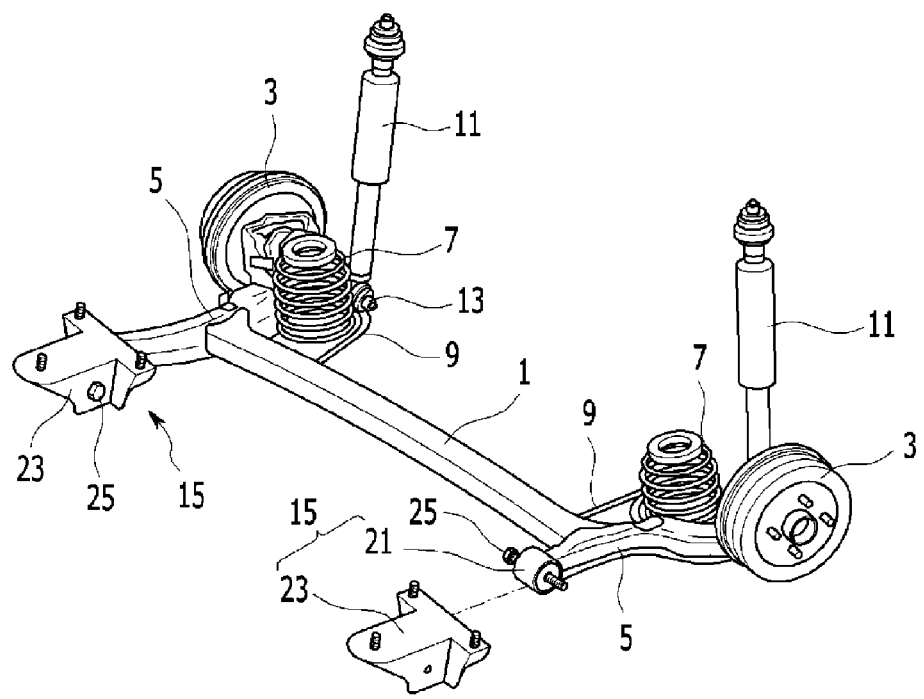
FIG. 1 is a perspective view of a coupled torsion beam axle type suspension system according to one example of the related art.
Figure 2:
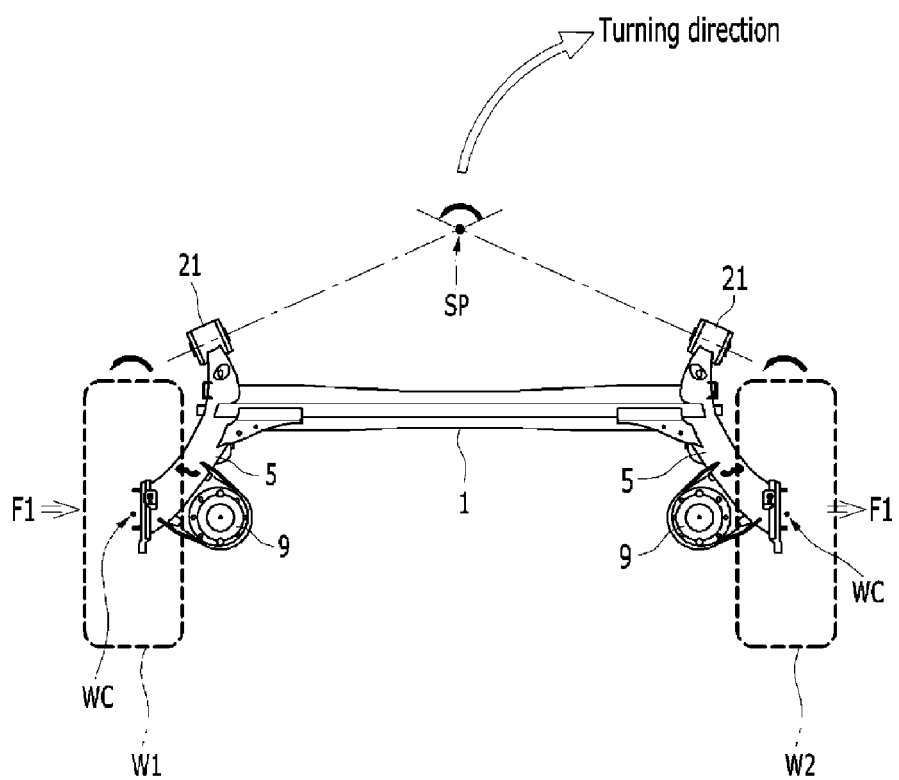
FIG. 2 is a top plan view illustrating movement characteristics of the coupled torsion beam axle type suspension system according to one example of the related art, applied with a side force.
Figure 3:
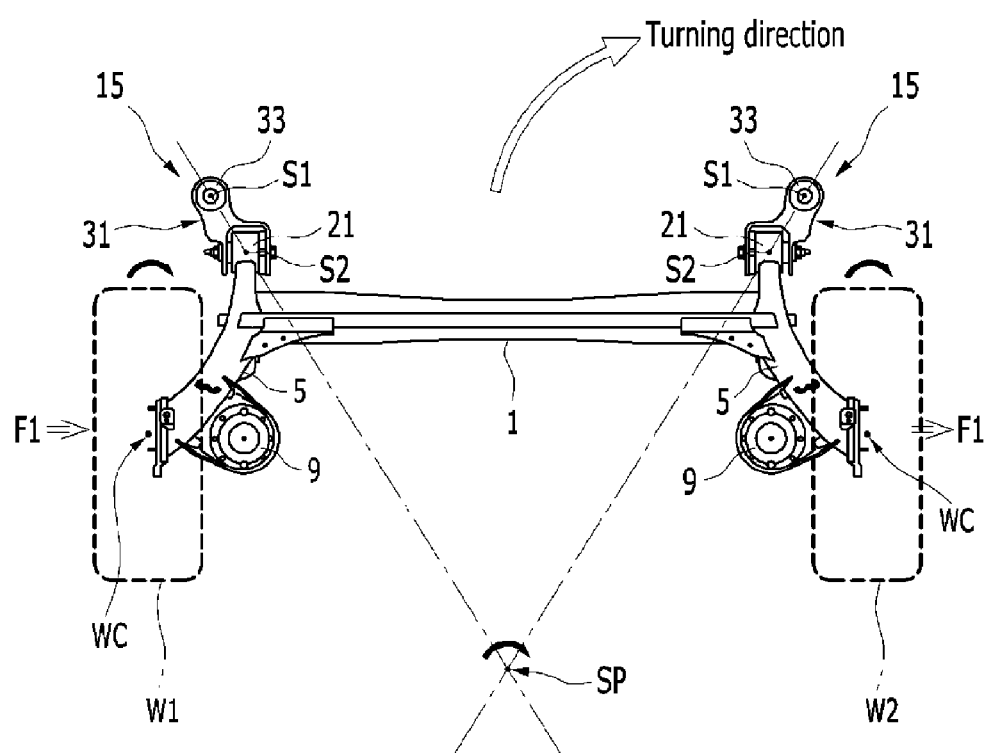
FIG. 3 is a top plan view illustrating movement characteristics of the coupled torsion beam axle type suspension system according to another example of the related art, applied with a side force.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, an exemplary embodiment of the present invention will be described in detail with reference to the accompanying drawings.

However, the size and thickness of each component illustrated in the drawings are arbitrarily shown for ease of description and the present invention is not limited thereto, and the thicknesses of portions and regions are exaggerated for clarity.

In addition, parts that are irrelevant to the description are omitted to clearly describe the exemplary embodiments of the present invention, and like reference numerals designate like elements throughout the specification, which also applies to the related art.

Figure 4:
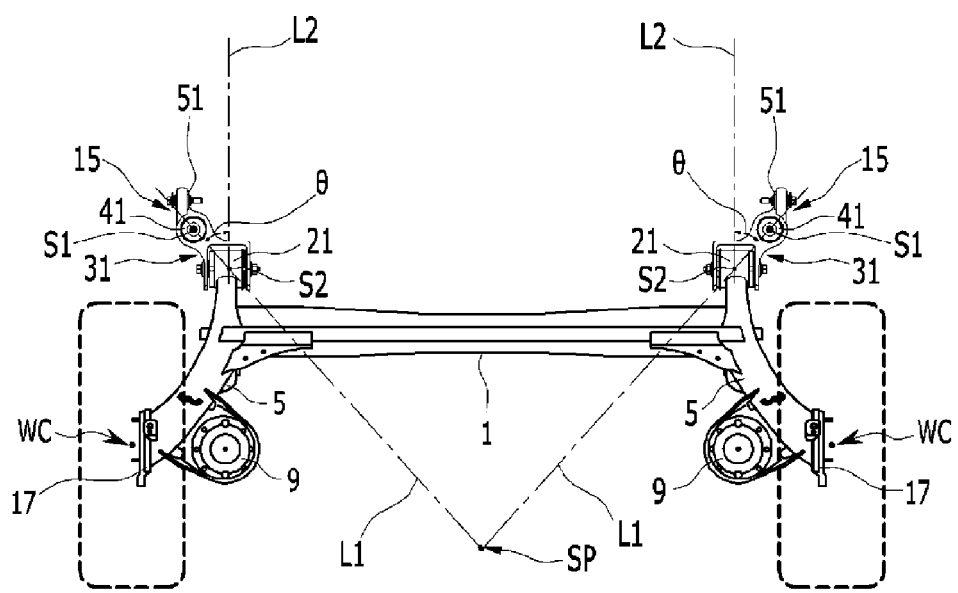
FIG. 4 is a top plan view of a coupled torsion beam axle type suspension system according to an exemplary embodiment of the present invention.

Further, when describing an exemplary embodiment of the present invention, for ease of description, it is assumed that an upper portion of FIG. 4, which illustrates a top plan view, is defined as a front direction and a lower portion is defined as a rear direction. A coupled torsion beam axle type suspension system according to an exemplary embodiment of the present invention is symmetrically provided in each rear wheel of a vehicle, and for ease of description, a description of one side will be applicable to the other side.

Figure 5:
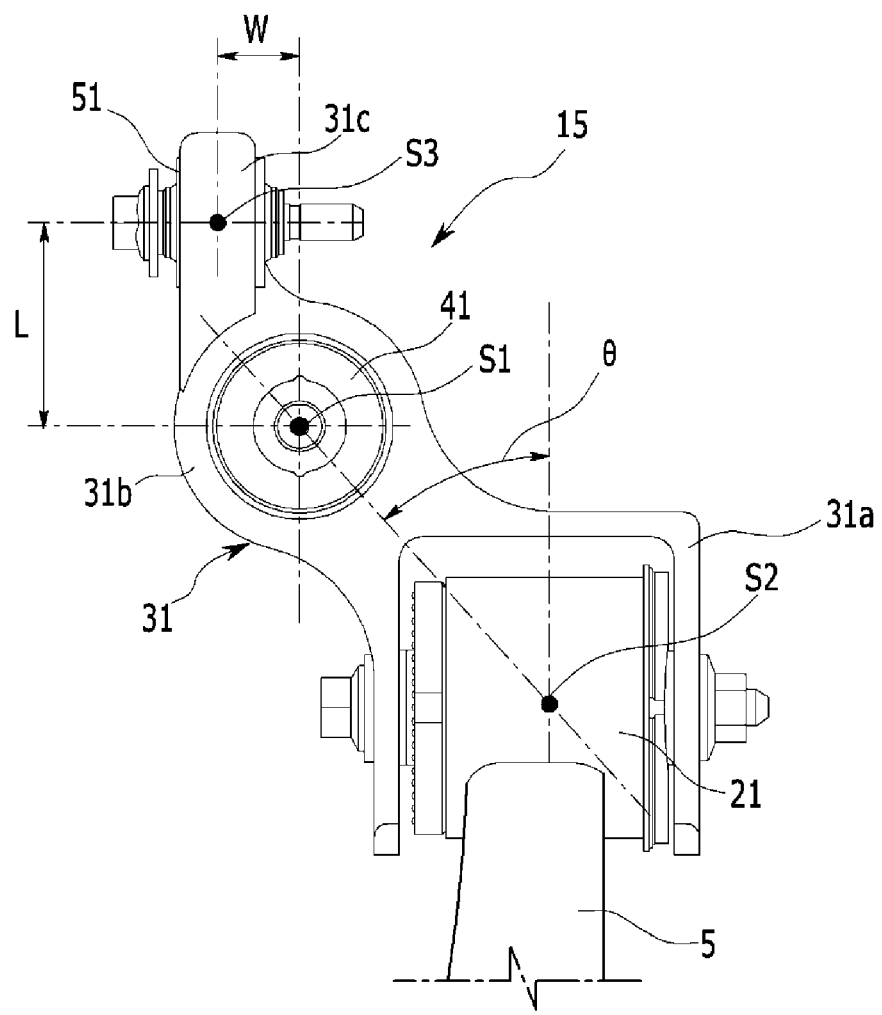
FIG. 5 is an enlarged top plan view of a vehicle body-engaging unit applicable to the coupled torsion beam axle type suspension system according to the exemplary embodiment of the present invention.
Figure 6:
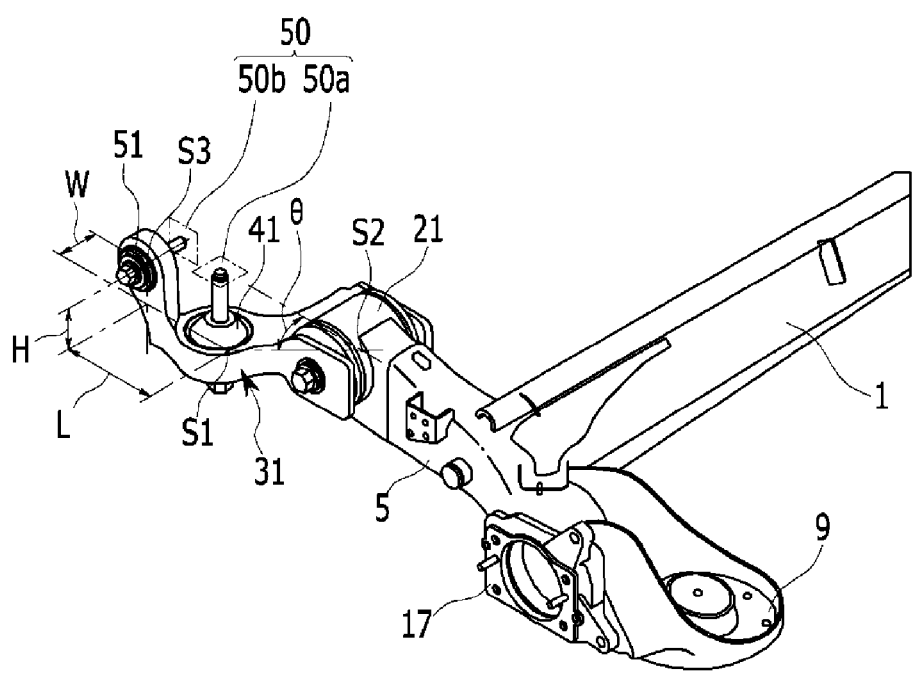
FIG. 6 is a perspective view of one side of the coupled torsion beam axle type suspension system according to the exemplary embodiment of the present invention.

FIG. 4 is a top plan view of a coupled torsion beam axle type suspension system according to an exemplary embodiment of the present invention, FIG. 5 is an enlarged a top plan view of a vehicle body-engaging unit applicable to the coupled torsion beam axle type suspension system according to the exemplary embodiment of the present invention, and FIG. 6 is a perspective view of one side of the coupled torsion beam axle type suspension system.

Referring to FIG. 4, a coupled torsion beam axle type suspension system (hereinafter referred to as a CTBA) is provided with a torsion beam 1 in a width direction of a vehicle, and trailing arms 5 respectively fixed to the opposite ends of the torsion beam 1 that are provided with spindle brackets 17 for mounting carriers.

A spring seat 9 is formed at a rear inner side of the trailing arms 5 to mount a spring.

In addition, the vehicle body-engaging unit 15 is provided at a front end portion of the trailing arms 5 to be coupled to a vehicle body.

In the CTBA according to the exemplary embodiment of the present invention, each vehicle body-engaging unit 15 includes a trailing arm bush 21, a link bracket 31, and lower and upper mounting bushes 41 and 51.

The trailing arm bush 21 is coupled to the front end portion of the trailing arm 5.

The link bracket 31 is disposed in front of the trailing arm bush 21 and is in parallel engaged therewith in the width direction of the vehicle.

In this case, referring to FIGS. 5 and 6, a pocket portion 31a is formed at a rear end portion of the link bracket 31 to be inserted by and engaged with the trailing arm bush 21, a horizontal portion 31b is integrally formed outside of the pocket portion 31a in front thereof and installed with the lower mounting bush 41, and a vertical portion 31c is upwardly and extendedly formed outside of the horizontal portion 31b in front thereof and installed with the upper mounting bush 51.

The lower mounting bush 41 is disposed outside of the trailing arm bush 21 in front thereof, and is engaged with a lower portion of the vehicle body 50, that is, a lower surface 50a of a side member above the horizontal portion 31b of the link bracket 31 in the height direction of the vehicle.

Further, the upper mounting bush 51 is disposed outside of the lower mounting bush 41 and in front thereof, and is engaged with one side of the vehicle body 50, that is, an outer lateral surface of a side member 50b above the vertical portion 31c of the link bracket 31 in the width direction of the vehicle.

In this case, referring to FIGS. 4 and 5, each of extending lines L1 that pass centers S1 of the lower mounting bushes 41 and centers S2 of the trailing arm bushes 21 forms an acute angle θ with a center line L2 that passes the center of the trailing arm bush 21 in the length direction of the vehicle, and an instantaneous rotational center point SP at which the extending lines L1 cross is set such that it is positioned behind wheel centers WC.

In addition, referring to FIGS. 5 and 6, a center S3 of the upper mounting bush 51 is respectively offset, based on the center S1 of the lower mounting bush 41, outwardly from the vehicle in the width direction thereof by a predetermined width W, upwardly from the vehicle in the height direction thereof by a predetermined height H, and forwardly from the vehicle in the length direction thereof by a predetermined length L.

In the exemplary embodiment of the present invention, a case in which a position of the upper mounting bush 51 is respectively offset, based on the center S1 of the lower mounting bush 41, outwardly from the vehicle in the width direction thereof by the predetermined width W, upwardly from the vehicle in the height direction thereof by the predetermined height H, and forwardly from the vehicle in the length direction thereof by the predetermined length L is exemplarily illustrated, but it is not limited thereto, and a case in which the position of the upper mounting bush 51 is offset, based on the center S1 of the lower mounting bush 41, by the predetermined width W, the predetermined height H, and the predetermined length L in any direction, so as to be provided on the link bracket 31 may be possible.

The CTBA according to the exemplary embodiment of the present invention is additionally provided with a strength member including the upper and lower mounting bushes 41 and 51, such that the strength member is engaged with the lower surface 50a and an outer lateral surface of the side member on the link bracket 31 that is engaged with the trailing arm bush 21.

In this case, the instantaneous rotational center point SP of the CTBA, with respect to the vehicle body, at which the extending lines L1 passing the centers S1 of the lower mounting bushes 41 and the centers S2 of the trailing arm bushes 21 cross each other, is formed behind the wheel centers WC.

Accordingly, the CTBA according to the exemplary embodiment of the present invention, in which the centers S1 and S2 of the lower mounting bushes 41 and the trailing arm bushes 21 are used as pivot points by the link brackets 31, forms a four-node link apparatus between the trailing arms 5 and the vehicle body 50.

Thus, in the CTBA, when rear wheels are applied with the side force F1, such as when the vehicle turns, the rear outer wheel W1 that is rotated and bumped based on the instantaneous rotational center point SP, is induced to toe-in while the rebounded rear outer turning wheel W2 maintains a set toe angle or is induced to toe-out, such that the vehicle is generally under-steered to secure the turning stability.

Further, in the CTBA according to the exemplary embodiment of the present invention, the strength of the trailing arm bush 21 and the strength of the lower mounting bush 41 are connected in series to improve impact characteristics against the thrust and drag forces, and the strength the lower mounting bush 41 and the strength of the upper mounting bush 51 are connected in parallel to improve distortion strength, thereby improving movement characteristics against the side force F1 and roll characteristics.

In addition, the strength member including the lower and upper mounting bushes 41 and 51 is additionally provided and thus a vibration property such as noise, vibration, and harshness (NVH) is improved, and rotational strength, which may not be sufficient due to use of rubber materials, is offset in three directions by the predetermined width, height, and length with respect to the lower mounting bush 41 and is reinforced by the upper mounting bush 51 that is engaged with the side member.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. They are not intended to be exhaustive or to limit the invention to the precise forms disclosed, and obviously many modifications and variations are possible in light of the above teachings as well as various alternatives and modifications thereof. It is intended that the scope of the invention be defined by the Claims appended hereto and their equivalents.

What is claimed is:

1. A coupled torsion beam axle type suspension system (CTBA), comprising:
   trailing arms respectively coupled to opposite ends of a torsion beam; and
   a vehicle body-engaging unit provided in a front end portion of each trailing arm and engaging the trailing arm with a vehicle body,
   wherein each vehicle body-engaging unit includes:
      a trailing arm bush that is coupled to a front end portion of the trailing arm;
      a link bracket mounted in front of the trailing arm bush and engaged therewith in a width direction of a vehicle;
      a lower mounting bush mounted outside of the trailing arm bush in front thereof, installed in the link bracket, and engaged with a lower part of the vehicle body in a height direction of the vehicle; and
      an upper mounting bush offset, with respect to the lower mounting bush, by a predetermined width in the width direction of the vehicle, a predetermined height in a height direction thereof, and a predetermined length in a length direction of the vehicle body, to be installed in the link bracket and to be engaged with the vehicle body in the height direction thereof.

2. The system of claim 1, wherein the link bracket includes:
   a pocket portion formed to be inserted by and engaged with the trailing arm bush;
   a horizontal portion formed outside of the pocket portion in front thereof and installed with the lower mounting bush; and
   a vertical portion upwardly and extendedly formed outside of the horizontal portion in front thereof and installed with the upper mounting bush.

3. The system of claim 1, wherein an instantaneous rotational center point at which extending lines passing centers of the lower mounting bushes and centers of the trailing arm bushes cross each other is set to be positioned behind wheel centers.

4. The system of claim 1, wherein a center of the upper mounting bush is offset, based on a center of the lower mounting bush, by the predetermined width in the width direction of the vehicle, the predetermined height in the height direction thereof, and a predetermined length in the length direction of the vehicle body.

5. The system of claim 1, wherein the lower and upper mounting bushes are respectively engaged with a bottom surface and an outer lateral surface of a side member of the vehicle body.

6. A coupled torsion beam axle type suspension system (CTBA), comprising:
   trailing arms respectively coupled to opposite ends of a torsion beam; and
   a vehicle body-engaging unit provided in a front end portion of each trailing arm and engaging the trailing arm with a vehicle body,
   wherein each vehicle body-engaging unit includes:
      a trailing arm bush coupled to a front end portion of the trailing arm;
      a link bracket mounted in front of the trailing arm bush and engaged therewith;
      a lower mounting bush installed in the link bracket and engaged with a lower part of the vehicle body in a height direction of a vehicle; and an upper mounting bush formed in the link bracket and engaged with one side of the vehicle body in the height direction thereof, wherein an instantaneous rotational center point at which extending lines passing centers of the lower mounting bushes and centers of the trailing arm bushes is set to be positioned behind wheel centers.

7. The system of claim 6, wherein the link bracket is in parallel engaged with the trailing arm bush in the height direction of the vehicle, wherein the lower mounting bush is disposed outside of the trailing arm bush in front thereof and is engaged with a lower portion of the vehicle body on the link bracket in the height direction of the vehicle, and wherein the upper mounting bush is upwardly disposed outside of the lower mounting bush in front thereof and is engaged with the link bracket in a width direction of the vehicle.

8. The system of claim 7, wherein the link bracket includes:

a pocket portion inserted by and engaged with the trailing arm bush;

a horizontal portion formed outside of the pocket portion in front thereof and mounted with the lower mounting bush; and a vertical portion upwardly and extendedly formed outside of the horizontal portion in front thereof and mounted with the upper mounting bush.

9. The system of claim 7, wherein an extending line that passes a center of the lower mounting bush and a center of the trailing arm bush forms an acute angle with a center line that passes a center of the trailing arm bush in a length direction of the vehicle body.

10. The system of claim 7, wherein the center of the upper mounting bush is offset, based on the center of the lower mounting bush, by a predetermined width in the width direction of the vehicle, by a predetermined height in the height direction thereof, and by a predetermined length in the length direction of the vehicle body.

11. The system of claim 7, wherein the lower and upper mounting bushes are respectively engaged with a bottom surface and an outer lateral surface of a side member of the vehicle body.

* * * * *